(12) United States Patent
Han et al.

(10) Patent No.: US 9,967,558 B1
(45) Date of Patent: May 8, 2018

(54) ADAPTIVE MOTION SEARCH CONTROL FOR VARIABLE BLOCK SIZE PARTITIONS IN VIDEO CODING

(71) Applicant: Google Inc., Mountain View, CA (US)

(72) Inventors: Jingning Han, Santa Clara, CA (US); Debargha Mukherjee, Cupertino, CA (US); Yaowu Xu, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 330 days.

(21) Appl. No.: 14/108,773

(22) Filed: Dec. 17, 2013

(51) Int. Cl.
*H04N 7/12* (2006.01)
*H04N 19/583* (2014.01)

(52) U.S. Cl.
CPC .............. *H04N 19/00733* (2013.01)

(58) Field of Classification Search
IPC ..................................................... H04N 19/533
See application file for complete search history.

(56) References Cited

U.S. PATENT DOCUMENTS

| | | |
|---|---|---|
| 5,537,635 A | 7/1996 | Douglas |
| 5,600,773 A | 2/1997 | Vanover et al. |
| 7,599,435 B2 | 10/2009 | Marpe et al. |
| 2005/0013366 A1* | 1/2005 | Gallant ............... H04N 5/145 375/240.16 |
| 2006/0215760 A1 | 9/2006 | Monaco |
| 2007/0074266 A1 | 3/2007 | Raveendran et al. |
| 2008/0123904 A1 | 5/2008 | Sakamoto |
| 2008/0151101 A1 | 6/2008 | Tian et al. |
| 2009/0207915 A1* | 8/2009 | Yan ....................... H04N 19/53 375/240.16 |

(Continued)

FOREIGN PATENT DOCUMENTS

| | | |
|---|---|---|
| CN | 1665300 A | 9/2005 |
| CN | 101990761 B | 1/2013 |
| WO | WO1997017797 A2 | 5/1997 |

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Tracy Y Li
(74) *Attorney, Agent, or Firm* — Young Basile Hanlon & MacFarlane, P.C.

(57) ABSTRACT

A block of a video data stream may be subject to a motion search for comparing inter prediction of the blocks to intra prediction of the block while being partitioned. A motion search using an initial search range finds a first motion vector for the block. The blocks is partitioned into at least two sub-blocks, each having a same size, and one or more motion searches are performed for each sub-block using a second search range and the first motion vector where the second search range is a fraction of the initial search range. Respective error values associated with each of the motion searches are compared to select a partition for coding the block, and the block may be encoded using the selected partition. Performing inter prediction in this fashion can improve the performance of an encoder in terms of both execution time and compression ratio.

19 Claims, 7 Drawing Sheets

(56) References Cited

U.S. PATENT DOCUMENTS

| | | | | |
|---|---|---|---|---|
| 2010/0246681 A1* | 9/2010 | Wang | ............... | H04N 19/00024 375/240.16 |
| 2010/0290530 A1 | 11/2010 | Huang | | |
| 2010/0296580 A1* | 11/2010 | Metoevi | ........... | H04N 19/00472 375/240.16 |
| 2011/0013695 A1* | 1/2011 | Endo | .................... | H04N 19/176 375/240.16 |
| 2011/0170595 A1* | 7/2011 | Shi | ......................... | H04N 19/52 375/240.16 |
| 2012/0154675 A1 | 6/2012 | Nasu et al. | | |
| 2013/0136187 A1* | 5/2013 | Matsuo | ............ | H04N 19/00569 375/240.16 |
| 2014/0044369 A1* | 2/2014 | Sekiguchi | ........ | H04N 19/00763 382/236 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

R. Li, B. B Zeng, and M. L. Liou, "A new three-step search algorithm for block motion estimation," IEEE Transactions on Circuits Systems Video Technology, vol. 4, pp. 438-442, Aug. 1994.

L. M. Po and W. C. Ma, "A novel four-step search algorithm for fast block motion estimation," IEEE Transactions on Circuits Systems Video Technology, vol. 6, pp. 313-317, Jun. 1996.

W. Li and E. Salari, "Successive elimination algorithm for motion estimation," IEEE Transactions on Image Processing, vol. 4, pp. 105-107, Jan. 1995.

X. Q. Gao, C. J. Duanmu, and C. R. Zou, "A multilevel successive elimination algorithm for block matching motion estimation," IEEE Transactions on Image Processing, vol. 9, pp. 501-504, Mar. 2000.

Y. W. Huang, S. Y. Chien, B. Y. Hsieh, and L. G. Chen, "Global elimination algorithm and architecture design for fast block matching motion estimation," IEEE Transactions on Circuits and Systems on Video Technology, vol. 14, pp. 898-907, Jun. 2004.

Bankoski et al. "Technical Overview of VP8, An Open Source Video Codec for the Web". Dated Jul. 11, 2011.

* cited by examiner

ADAPTIVE MOTION SEARCH CONTROL FOR VARIABLE BLOCK SIZE PARTITIONS IN VIDEO CODING

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Real-time video streaming, multi-point video conferencing or video broadcasting are examples of applications that employ video stream encoding including compression.

SUMMARY

This disclosure relates in general to a motion search algorithm for variable block size partitions used in video coding. One method for encoding a video frame described herein includes performing, for a block of a plurality of blocks of the video frame, a motion search using an initial search range to find a first motion vector for the block, partitioning the block into at least two first sub-blocks, each having a first sub-block size, performing, for each of the at least two first sub-blocks, a motion search using a second search range and the first motion vector, comparing respective error values associated with each of the motion searches to select a partition for coding the block, and encoding, using a processor, the block within an encoded bitstream using the selected partition. The second search range is a fraction of the initial search range.

An apparatus for encoding a video frame described herein includes a memory and a processor. According to one implementation, the processor is configured to execute instructions stored in the memory to perform, for a block of a plurality of blocks of the video frame, a motion search using an initial search range to find a first motion vector for the block, partition the block into at least two first sub-blocks, each having a first sub-block size, perform, for each of the at least two first sub-blocks, a motion search using a second search range and the first motion vector, compare respective error values associated with each of the motion searches to select a partition for coding the block, and encode the block within an encoded bitstream using the selected partition. The second search range is a fraction of the initial search range.

According to another implementation of an apparatus for encoding a video frame, the processor is configured to execute instructions stored in the memory to perform, for a block of a plurality of blocks of the video frame, a motion search using an initial search range to find a first motion vector for the block, partition the block into at least two first sub-blocks, each having a first sub-block size, perform, for each of the at least two first sub-blocks, a first motion search using a second search range and the first motion vector wherein the second search range is a fraction of the initial search range, perform, for each of the at least two first sub-blocks, a second motion search using the second search range and a second motion vector wherein the second motion vector is of a spatially neighboring block of the first sub-block, compare respective error values associated with each of the motion searches to select a partition for coding the block, and encode the block within an encoded bitstream using the selected partition.

Variations in these and other aspects of this disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
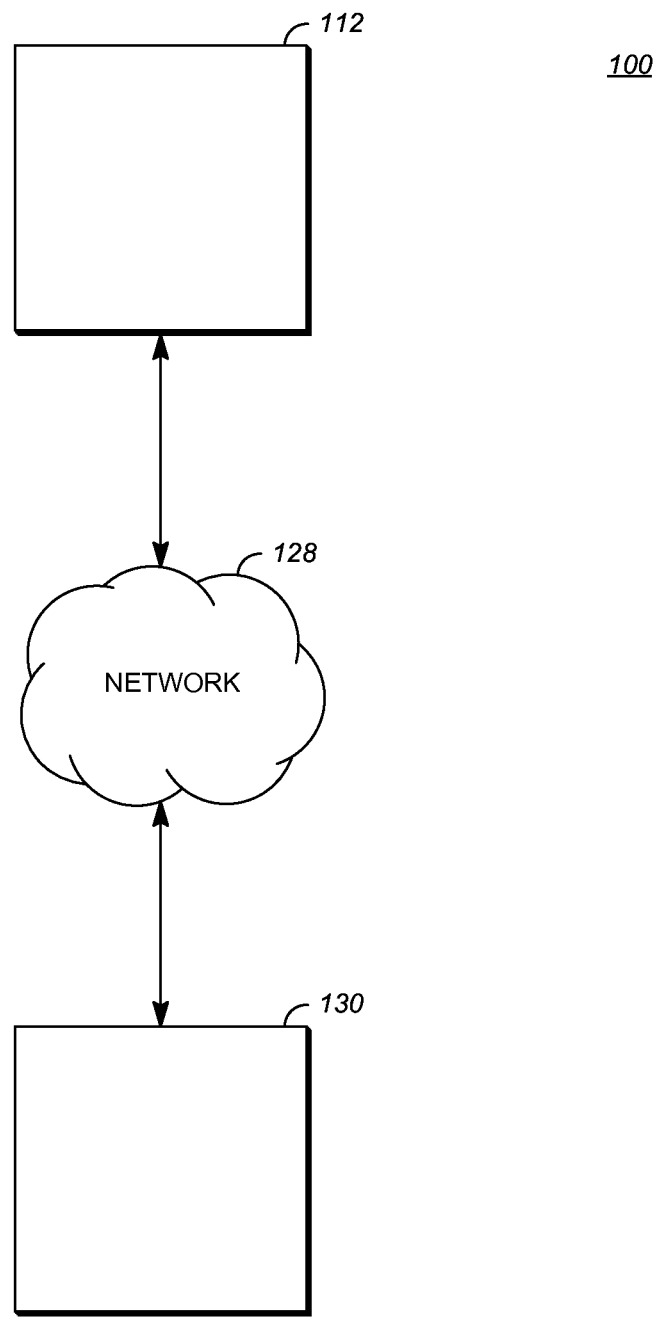
FIG. 1 is a schematic of a video encoding and decoding system.

A video stream may be compressed by a variety of techniques to reduce bandwidth required transmit or store the video stream. A video stream can be encoded, which can involve compression, and then transmitted to a decoder that can decode or decompress the video stream to prepare it for viewing or further processing. Techniques for encoding video streams include prediction, which attempts to predict the pixel values of a block of a frame of a video stream using either pixels peripheral to the block to be predicted, called intra prediction, or attempts to predict the pixel values of a block using a possibly displaced block or blocks from a temporally nearby frame or frames, called inter prediction. In either case, a prediction block is generated and subtracted from the block to be encoded to form a residual block representing the difference between the blocks. The residual block can be further encoded to reduce the number of bits to be included in the output encoded video bitstream in comparison to encoding the original block while maintaining the quality of the decoded video stream.

In inter prediction, the process of find the reference block that best resembles the current block (i.e., the one to be coded) is generally referred to as a motion search. Motion searching is one of the most computationally intensive steps in the encoding process. The accuracy of a motion search (i.e., its ability to find a good reference block) significantly affects the overall compression performance of an encoder.

Blocks of a frame may be subdivided in a process called variable partitioning for prediction and subsequent transformation, quantization and entropy coding operations. The use of variable partition types allows optimization of the trade-off between small overhead cost (for stationary signals) and flexibility in handling variations in statistical characteristics. Generally, an encoder will test all possible partition types for the block of interest and select the one that minimizes rate-distortion cost as the final encoding decision. Performing a motion search for sub-blocks resulting from all possible partition types can significantly increase computing time.

The teachings herein exploit the fact that a block will be test coded multiple times in a rate-distortion optimization loop with different partition types. Instead of trying to reduce the amount of search points in a single motion search process, the multiple motion search loops integrated in the encoding process of optimized and simplified. As described in additional detail below, a conventional motion search of a large block with large search range is followed by a motion search for each sub-block that employs the previously obtained motion vector as a starting point and operates with a reduced range. Computation load can be substantially reduced while retaining search accuracy. More details can be had by first referring to an environment in which the teachings herein may be implemented and by then referring to a process implementing the teachings.

FIG. 1 is a schematic of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
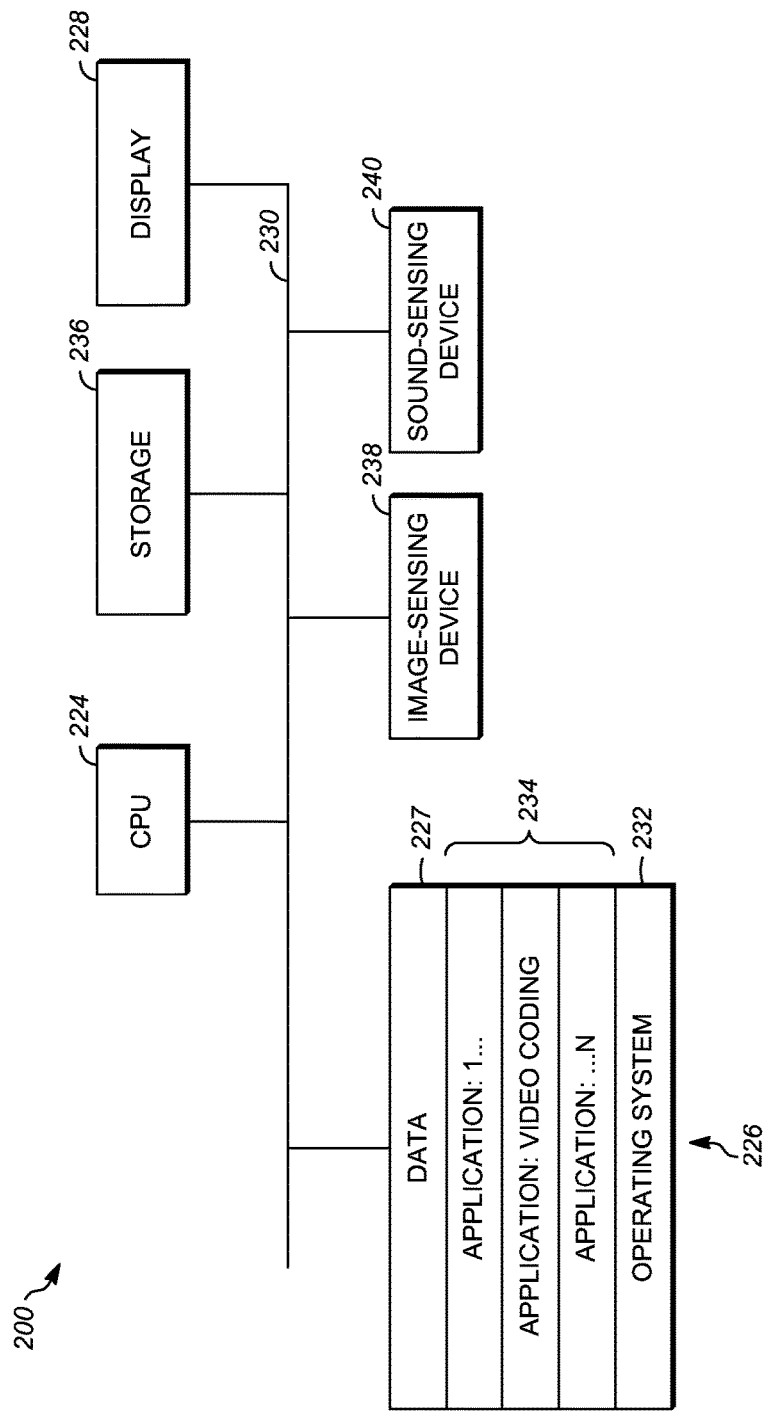
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

When used in a video conferencing system, for example, transmitting station 112 and/or receiving station 130 may include the ability to both encode and decode a video stream as described below. For example, receiving station 130 could be a video conference participant who receives an encoded video bitstream from a video conference server (e.g., transmitting station 112) to decode and view and further encodes and transmits its own video bitstream to the video conference server for decoding and viewing by other participants.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video coding application that performs the methods described here. Computing device 200 can also include a secondary storage 236 that can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
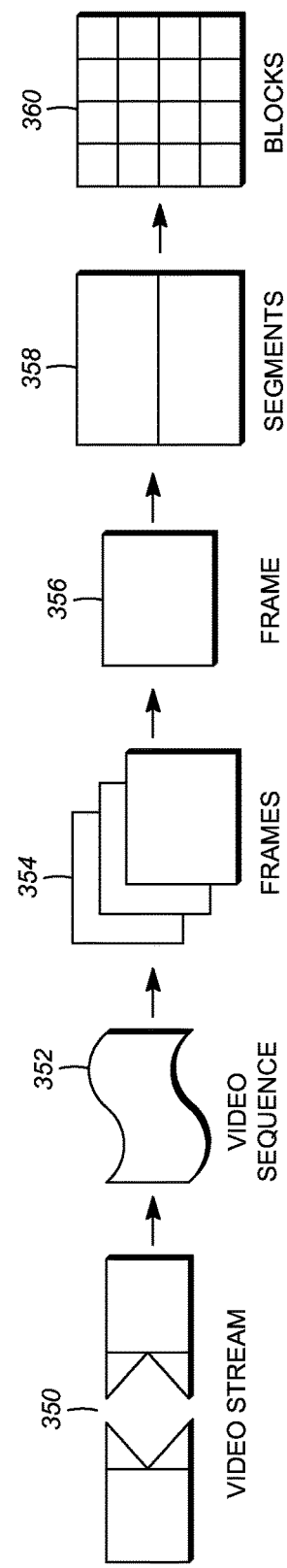
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames 354. Adjacent frames 354 can then be further subdivided into individual frames, e.g., a single frame 356. At the next level, a single frame 356 can be divided into a series of segments or planes 358. Segments (or planes) 358 can be subsets of frames that permit parallel processing, for example. Segments 358 can also be subsets of frames that separate the video data into different color components. For example, a frame 356 of color video data can include a luminance plane and two chrominance planes. Segments 358 may be sampled at different resolutions.

Whether or not frame 356 is divided into segments 358, frame 356 may be further subdivided into blocks 360, which can contain data corresponding to, for example, 16×16 pixels in frame 356. Blocks 360 can also be arranged to include data from one or more planes of pixel data. Blocks 360 can also be of any other suitable size such as 4×4, 8×8 16×8, 8×16, 16×16 or larger. Unless otherwise noted, the terms macroblock and block used interchangeably herein. Sub-blocks refer to two or more blocks formed by partitioning a larger block and processes described in encoding and decoding a block generally apply to sub-blocks of the block when the block is partitioned into sub-blocks.

Figure 4:
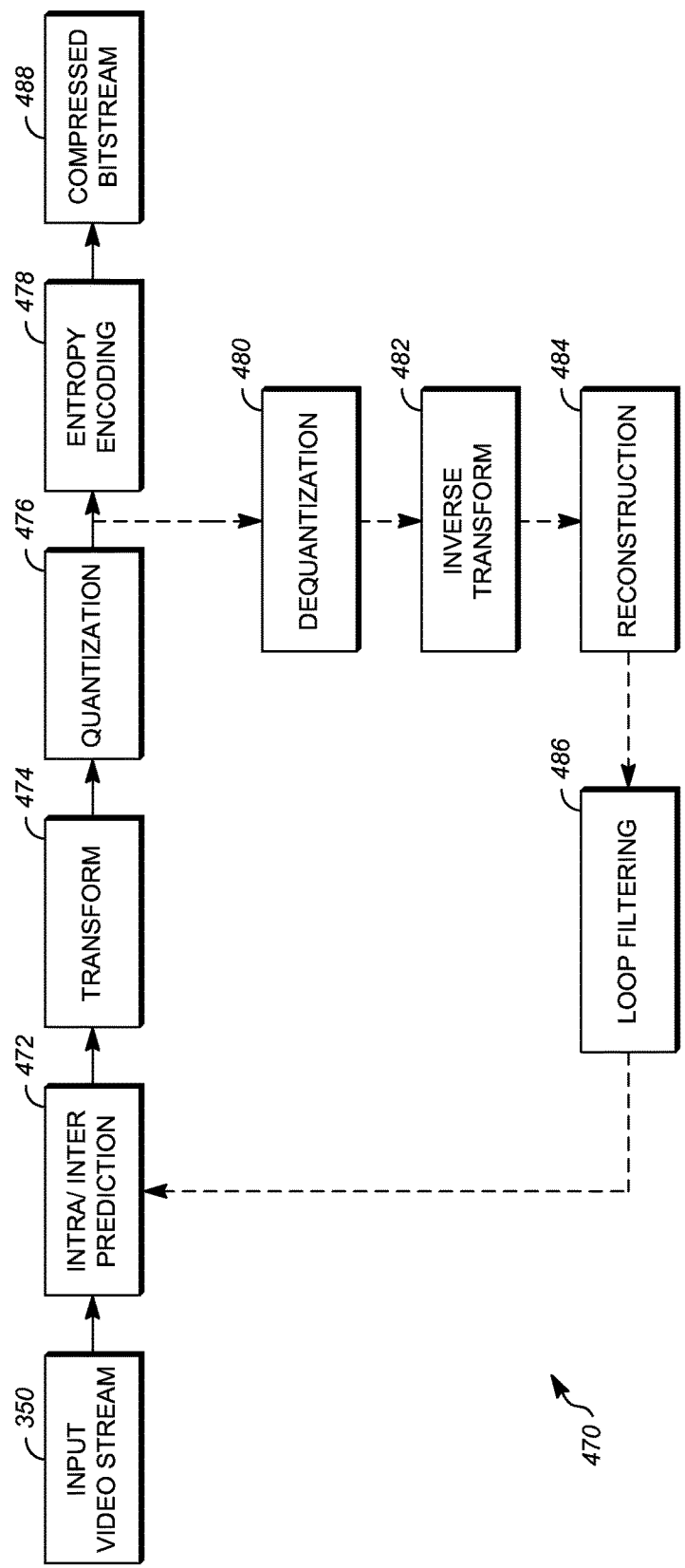
FIG. 4 is a block diagram of a video compression system in according to an implementation of the teachings herein.

FIG. 4 is a block diagram of an encoder 470 in accordance with an implementation of the teachings herein. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 4, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 can be processed in units of blocks. At the intra/inter prediction stage 472, each block can be encoded using intra-frame prediction (also called intra prediction) or inter-frame prediction (also called inter prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames in association with a motion vector.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix. Note that the size of the prediction block may be different from the size of the transform block due to variable partitioning.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream or encoded video bitstream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474 for certain blocks or frames. In another implementation, an encoder 470 can have quantization stage 476 and dequantization stage 480 combined into a single stage.

Figure 5:
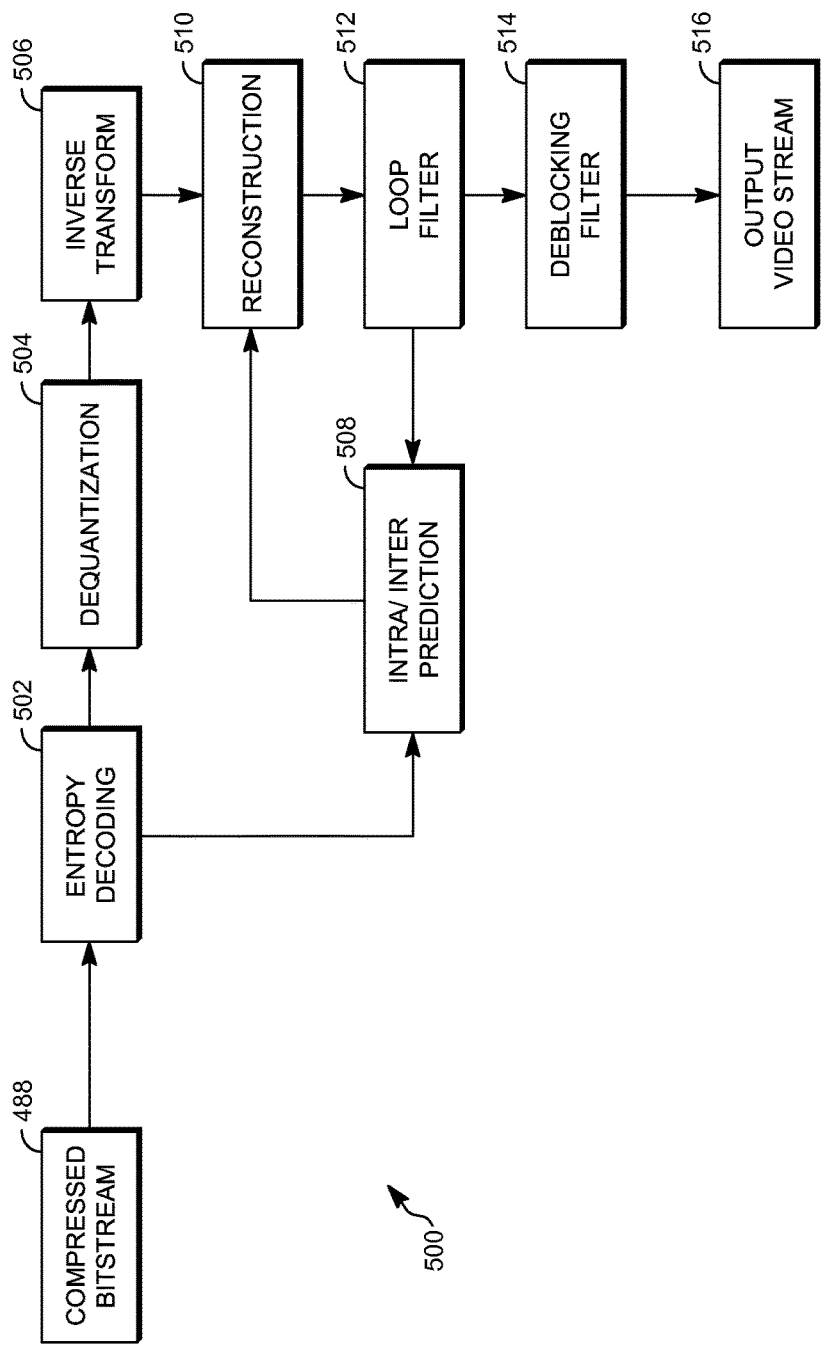
FIG. 5 is a block diagram of a video decompression system in according to an implementation of the teachings herein.

FIG. 5 is a block diagram of a decoder 500 in accordance with another implementation of the teachings herein. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. In this example, deblocking filtering stage 514 is applied to the reconstructed block to reduce blocking distortion, and the result is output as output video stream 516. Output video stream 516 can also be referred to as a decoded video stream, and the terms will be used interchangeably herein.

Other variations of decoder 500 can be used to decode compressed bitstream 488. For example, decoder 500 can produce output video stream 516 without deblocking filtering stage 514.

As part of the processes described above, a rate-distortion loop is performed to determine the most efficient coding mode for each block, including its best prediction mode and partition mode, for example. Motion search is part of this loop in assessing inter prediction modes. A rate-distortion loop determines the rate, or number of bits output from the encoding process versus the distortion, or change in visual quality of the video stream as a result of encoding and decoding. Distortion can be measured in a number of different ways including measuring the mean squared error (difference) between the data of the video stream before encoding and decoding and the data of the video stream following encoding and decoding. Thus, Rate distortion can measure the number of bits required to represent an encoded block (or other subdivision of a video stream) for a given level of distortion. Relevant to a motion search, a rate-distortion loop can measure the rate distortion for more than one motion search for a given block or sub-block, thereby permitting the selection of the motion search that provides the best prediction for that block or sub-block. The adaptive motion search control described herein with reference to FIG. 6 may be performed within a conventional rate-distortion loop or separately with its results provided to the rate-distortion loop to determine the best prediction mode, partition mode and, if any, motions vector(s).

Figure 6:
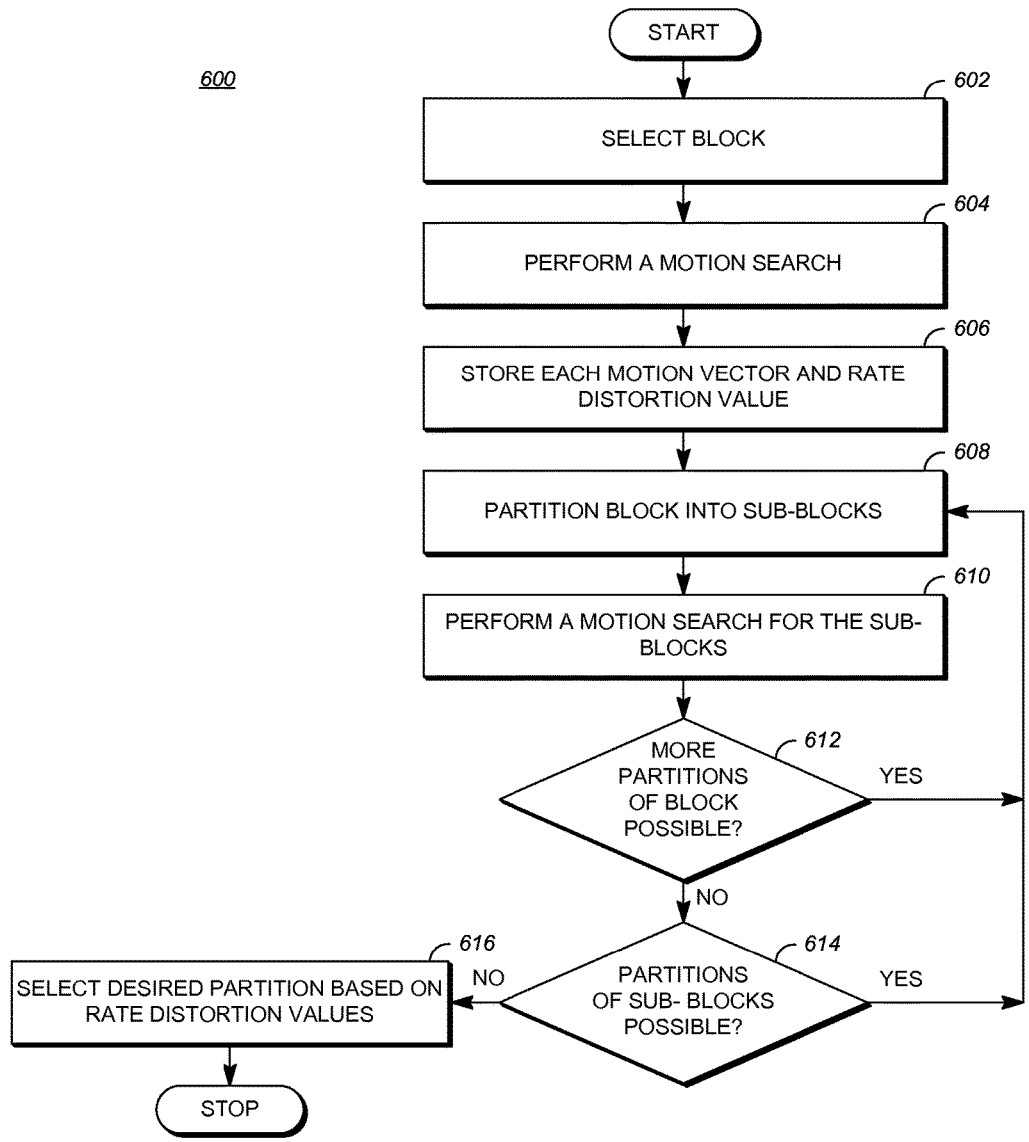
FIG. 6 is a flowchart diagram of a process for encoding a block of a video frame according to an implementation of the teachings herein.

FIG. 6 is a flowchart diagram of a process for encoding a block of a video frame according to an implementation of the teachings herein. In particular, process 600 uses adaptive motion search control for variable block size partitions in video coding. Process 600 can be implemented in a system such as computing device 200 to code a video stream. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, a block is selected from the plurality of blocks of a frame to be encoded. The frame may be one of a plurality of frames of a video stream to be encoded. Herein, select means to choose, indicate, mark, save or otherwise select in any fashion whatsoever. Blocks may be selected and processed in raster scan order, for example. In raster scan order, the blocks of a frame are selected starting at the upper left-hand corner of the frame and then are selected along rows starting at the left-hand margin and proceeding from left to right along each row from the top to the bottom of the frame.

At step 604, a motion search is performed on the selected block. By performed we can mean determine, compute, process, calculate, execute or in any manner whatsoever perform the indicated function. As discussed above with reference to FIG. 4, a motion search finds a reference block. A reference block is a contiguous group of pixels from a reference frame that conforms in size and shape to the selected block and most closely matches the pixel values in the selected block of the choices. Motion searching can spatially translate pixels from a reference frame to bring them into registration with pixels from a selected block or sub-block to permit the pixels from the reference frame to be used to predict the selected block or sub-block. Pixels from the reference frame can be translated by several different values in X and Y and the degree to which the translated pixels match the pixels from the selected block or sub-block determined. The translation values in X and Y that result from a motion search are referred to as a motion vector.

Any technique for performing a motion search is possible. The size and sample rate of the area over which the pixels will be translated are generally predefined by an encoder, but may be set by a user. While an exhaustive search of all possible matching blocks can be performed, it may be desirable to perform a fast motion search algorithm, such as those developed for a single block search. One category of fast motion search algorithms involves an iterative process whereby, for the block of interest, an initial area is searched by sampling a subset of candidate reference blocks with an initial step size. The one that is the most like the block to be encoded is selected to refine the search area in a next iteration. That is, the next iteration samples a subset of candidate reference block around the best matching block from the previous iteration with a reduced step size. This process can be repeated till step size goes to a minimum value such as one. In this process, the best matching candidate reference block may be determined by, for example, calculating the sum of absolute difference (SAD) of the pixels of the block to be encoded and the pixels of each candidate reference block translated by the associated motion vector so that the pixels are co-aligned. The reference block resulting in the lowest value for SAD may be selected as the best match for the current block. Another category of fast motion search algorithms is similar but calculates a sum of pixel values of the candidate reference block, compares it against the similar sum for the current block. If the difference between these sums is above a given threshold, checking the candidate block is skipped. Otherwise, a full check is performed using SAD or a similar comparison technique.

Regardless of the technique used for the motion search at step 604, the result includes the motion vector associated with the selected candidate block and the rate-distortion value resulting from encoding the current block using the selected candidate block. These values are stored at step 606. Storing involves storing the information in any computing device, whether remote or local, that is accessible to process 600.

Figure 7:
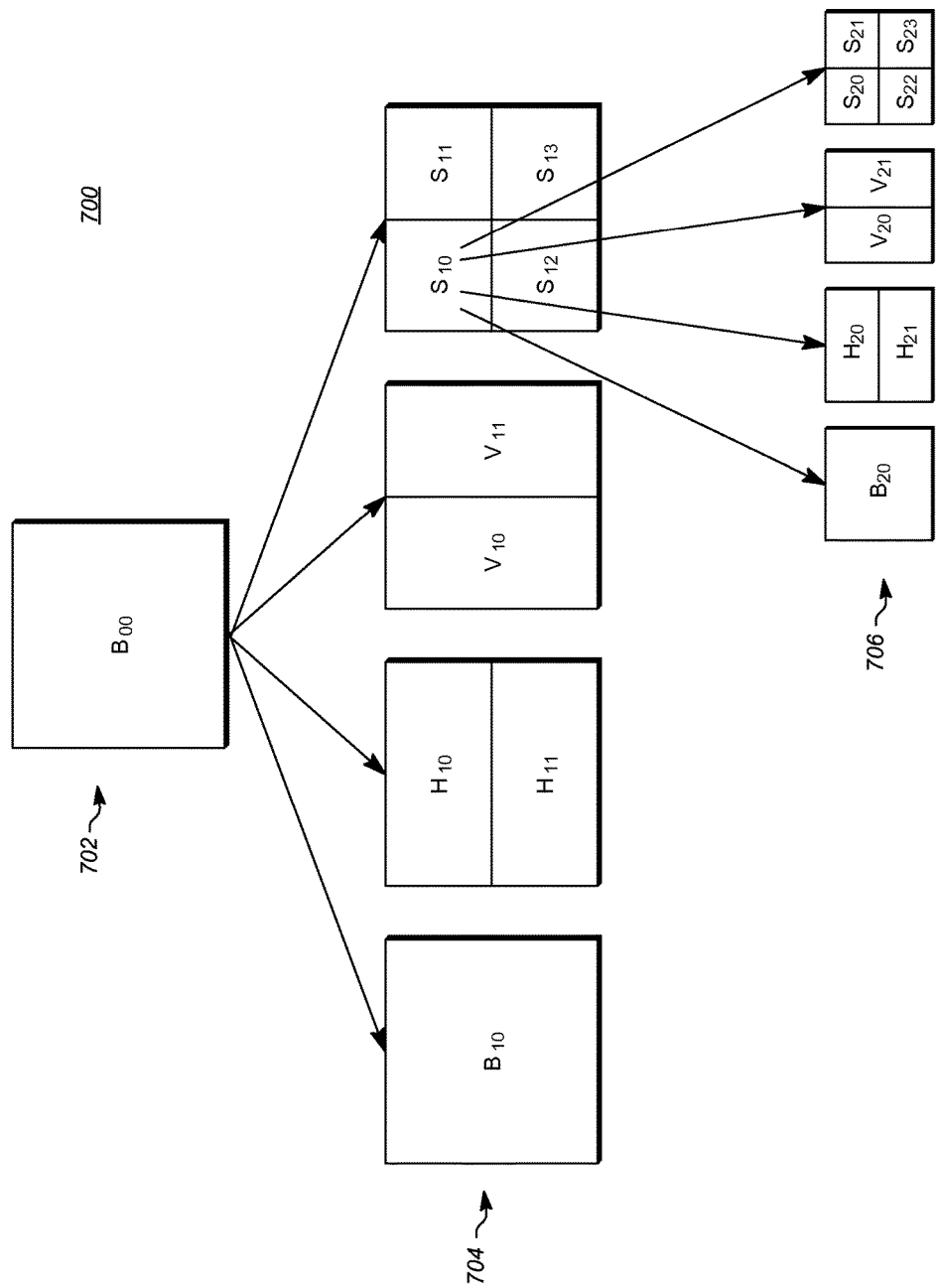
FIG. 7 is a diagram of blocks and sub-blocks used to explain the process of FIG. 6.

At step 608, the currently-selected block is partitioned into sub-blocks using a partitioning technique. Typically, a plurality of partition types and the smallest sub-block resulting from partitioning are predefined by an encoder, but this is not required—these may be set by a user. Block partitioning may be explained by referring to FIG. 7. Therein, blocks and sub-blocks are partitioned hierarchically. FIG. 7 shows levels of hierarchical sub-blocks generated from an original block 702 (also referred to as block $B_{00}$), namely a first partition level 704 comprising sub-blocks generated by different partition types designated for blocks having a size corresponding to the original block and a second partition level 706 comprising sub-blocks generated by different partition types designated for blocks having a size corresponding to the smallest sub-block size of the first partition level. The number of levels of partitioning may depend upon the size of a block and may be a single level or more than two levels. Partitioning may occur until the smallest sub-block size is reached, for example, 2×2 pixels or 4×4 pixels.

According to the description above, the originally selected block $B_{00}$ can be predicted as described above at step 604 and the resulting rate distortion value and motion vector stored as described at step 606. Conceptually, and referring to FIG. 7, this can be thought of as predicting block $B_{00}$ using a largest partition $B_{10}$ of that block (e.g., the entire block) at first partition level 704. The remaining available partition types that may be used at step 608 are shown in FIG. 7 as horizontal-type, resulting in sub-blocks $H_{10}$ and $H_{11}$, vertical-type, resulting in sub-blocks $V_{10}$ and $V_{11}$ and split-type, resulting in sub-blocks $S_{10}$, $S_{11}$, $S_{12}$ and $S_{13}$.

Referring again to FIG. 6, a motion search is performed for each sub-block of the first partition type at the first partition level 704 at step 610. In these motion searches, the resulting motion vector from the previous level is used as a candidate starting motion vector, and the search range is a fraction of the search range of the above stage or level. For example, a reduced search range for the first partition level may be one-quarter of the original range. The motion vectors of spatially neighboring blocks to each of the sub-blocks may also be used as candidate starting motion vectors, when available. When processing blocks in raster-scan order, blocks (or sub-blocks) sitting above and to the left of the current sub-block have already been processed and have available motion vectors for this analysis. Each of the candidate starting motion vectors may be used to determine a reference block for current sub-block. The best matching reference block defines the starting motion vector for the sub-block. Using this starting point, a motion search is performed using the reduced search range for each sub-block of the partition type.

Step 610 may be explained further by reference to FIG. 7. Assuming the first partition type for block $B_{00}$ (other than the largest partition into block $B_{10}$) is the horizontal-type partition, a motion search is performed for sub-block $H_{10}$ by determining a reference block for sub-block $H_{10}$ using the motion vector (and corresponding reference frame) for block $B_{00}$ (or sub-block $B_{10}$) stored at step 606. In addition, the motion vectors for each of the block or sub-block above and to the left of sub-block $H_{10}$ are used to determine at least two additional respective reference blocks. The best matching reference block of all available reference blocks (such as the one with the lowest value for SAD) is used as the starting point for the motion search for sub-block $H_{10}$ within the reduced search range for the first partition level (such as one-quarter of the original range). The motion search can be an exhaustive search or one of the fast motion search algorithms described above. The results of this motion search include a motion vector associated with the best matching candidate reference block and a rate-distortion value associated with predicting sub-block $H_{10}$ using that motion vector.

Similar steps are performed for sub-block $H_{11}$. That is, using each of the motion vectors for sub-block $B_{10}$, the block or sub-block to the left of sub-block $H_{11}$, and the block or sub-block above sub-block $H_{11}$, a reference block is determined for sub-block $H_{11}$. In this case, sub-block $H_{10}$ may be considered to be the sub-block above sub-block $H_{11}$. Then, the reference block of the three most similar to sub-block $H_{11}$ is used as a starting point for the motion search of sub-block $H_{11}$ using the reduced search range for the first partition level. The results of this motion search include a motion vector associated with the best matching candidate reference block and a rate-distortion value associated with predicting sub-block $H_{11}$ using that motion vector.

The sum of the rate-distortion values for predicting each of sub-blocks $H_{10}$ and $H_{11}$ is the total rate-distortion value associated with the horizontal-type partition of block $B_{00}$ and is stored together with the motion vectors at step 610.

At next step 612, a query is made as to whether more partitions of the block are possible. If more partition types are available to the block, then process 600 returns to step 608 to partition the block according to the next partition type. Referring to FIG. 7, for example, additional partition types—a vertical-type partition and a split-type partition—are available to block $B_{00}$, so process 600 would proceed to analyze these partitions in a like manner as described above with respect to the horizontal-type partition.

Process 600 as described above uses motion vectors found for blocks or sub-blocks immediately to the left and above the sub-block being analyzed to generate reference blocks at step 610. In the example of FIG. 7, one implementation uses sub-block $H_{10}$ as the block above sub-block $H_{11}$. However, this is not necessary, and the blocks or sub-blocks above the original block (e.g., block $B_{00}$) may be used for all sub-blocks partitioned from the original block, including those in first, second and subsequent partition levels.

After all partition types available to the current block are analyzed (i.e., the response to the query of step 612 is no), process 600 advances to step 614 to determine whether partitions of the sub-blocks are possible. In general, this may be done by determining whether the smallest sub-block size has been analyzed. If not, partition types are available to the smallest sub-blocks resulting from the first partition level and may be tested by partitioning those sub-blocks starting with step 608.

For example, and again referring to FIG. 7, the smallest partition resulting from the partition types of first partition level 704 includes sub-blocks $S_{10}, S_{11}, S_{12}$ and $S_{13}$. Each can be partitioned according to available partition types for the sub-block size at second partition level 706. Each sub-block of second partition level 706 has available a no-partition mode, a horizontal-type partition, a vertical-type partition and a split-type partition. In this example, only the partitions of sub-block $S_{10}$ are shown for simplicity. Specifically, second partition level 706 includes sub-block $B_{20}$, which represents the non-partitioned sub-block of sub-block $S_{10}$, sub-blocks $H_{20}$ and $H_{21}$, which are the output of a horizontal-type partition of sub-block $S_{10}$, sub-blocks $V_{20}$, and $V_{21}$, which are the output of a vertical-type partition of sub-block $S_{10}$, and sub-blocks $S_{20}, S_{21}, S_{22}$ and $S_{23}$, which are the output of a split-type partition of sub-block $S_{10}$. Thus, one of the available partition types is selected to partition sub-block $S_{10}$ at step 608.

Once sub-blocks are formed by partitioning sub-block S10, a motion search is performed for each sub-block at step 610. This process is similar to that performed for sub-blocks of first partition level 704. Namely, the motion vector from the sub-block generated at first partition level 704 is used to generate a reference block for each of its partitioned sub-blocks at second partition level 706. In addition, motion vectors for spatially-adjacent blocks or sub-blocks to the current sub-block at second partition level 706 are used to generate respective reference blocks. The motion vector associated with the reference block that is most similar to the current sub-block being analyzed is a starting point for the motion search. For motion searches at second partition level 706, a reduced search range as compared to that used for first partition level 704. One example of a reduced search range is one-fourth of the search range used for the partitioned sub-blocks of first partition level 704. The motion search can be an exhaustive search or one of the fast motion search algorithms described above. The results of this motion search include a motion vector associated with the best matching candidate reference block and a rate-distortion value associated with predicting the sub-block using that motion vector.

Each sub-block of a partition type is so analyzed to determine the total rate-distortion value associated with the partition type. At step 612, process 600 inquires as to whether all partition types of the current sub-block and of the other sub-blocks of the first partition level have been analyzed. For example, and referring to FIG. 7, if a horizontal-type partition, vertical-type partition and split-type partition are all analyzed for sub-block $S_{10}$, process 600 could return to step 608 to analyze the possible partitions for sub-block $S_{11}$ and so on until all partitions types for sub-blocks of the first partition level 704 (e.g., sub-blocks $S_{10}, S_{11}, S_{12}$ and $S_{13}$) are processed. Then, in response to an answer of no to the inquiry of step 612, process 600 advances to step 614 to determine whether further partitioning is possible. In the example of FIG. 7, it is assumed that sub-blocks S20, S21, S22 and S23 represent the smallest partition size for the encoder. Hence, no further partitioning of sub-blocks is possible. In this way, process 600 recursively proceeds to analyze blocks until the smallest unit is analyzed while reducing the search range as a fraction of that of the above stage or level.

In the described examples, the search parameters changed for the motion search of each block and sub-block are the starting motion vector and the search range. For simplicity, it is desirable that the type of motion search and its remaining search parameters are not changed. However, this is not a requirement and the type of motion search and other parameters may be changed at the different stages or levels or even based on the partition type.

It should be noted that, to minimize computations, there are no calculations for a sub-block resulting from the largest partition (e.g., no partition) of another block or sub-block described herein. In FIG. 7, this means that no new motion vector need be calculated for sub-block $B_{20}$ since the motion vector for sub-block $S_{10}$ is already calculated. In some implementations, however, it may be desirable to do so by changing the blocks used in order to select motion vectors in the determination of the starting point for a motion search or by changing other search parameters.

After the smallest sub-blocks resulting from partitioning are analyzed, process 600 advances to step 616. At step 616, the desired partition type or combination of partition types for the parent, original block (block $B_{00}$ in FIG. 7) is selected based on the rate-distortion values from the motion searches of steps 604 and 610. The particular technique for choosing partition type(s) for a block is not limited, and it is contemplated that any one of a number of techniques may be used with the teachings herein. In one implementation, for example, sub-blocks are grouped into various candidate arrangements such that the sub-blocks completely cover the original block without overlapping. The sub-blocks selected can be of different size and shape as long as the whole group of sub-blocks includes all of the pixels of the originally selected block without overlap. Then, the rate-distortion values for each of the sub-blocks in these combinations, generated at steps 604 and 610, are totaled to select the partition types that result in the lowest total rate-distortion value. Referring to FIG. 7, one such candidate arrangement comprises sub-blocks $H_{20}, H_{21}, S_{12}$ and $V_{11}$. Another candidate arrangement could include $H_{10}, S_{12}$ and $S_{13}$.

A different approach may select the smallest sub-blocks available and then combining them into larger sub-blocks if the larger sub-block does not increase the total rate-distortion value. In this way, the fewest number of partitions would result.

Process 600 ends after selecting the partition type(s) for the block.

The total rate-distortion value for encoding the block resulting at step 616 may be compared to the rate-distortion values for various intra prediction modes for the block to determine whether to encode the block using intra prediction or using inter prediction with the selected partition(s) for the block. After encoding the block, process 600 can be repeated for each block of the frame until all blocks are processed. Then, the next frame, if any, can be processed until all data of the video stream is processed. When a block is encoded using partitioning as described herein, bits are added to the bitstream to indicate how the block is partitioned, and a motion vector for each sub-block is encoded into the bitstream by differential coding of the motion vector or by other techniques familiar to those skilled in the art.

By optimizing and simplifying multiple motion search loops integrated into the encoding process as described herein, more optimal results may be obtained with fewer calculations than merely trying to reduce the number of points to be searched in a single motion search process. According to the teachings herein, a motion search of a relatively large block with relatively large search range is followed by motion search for each sub-block resulting from a partition of that block employing the previously obtained motion vector as potential starting point with a reduced range. Since the result space of all motion search results can be a complex space, possibly including multiple local minimums, a conventional motion search on a sub-block can result in sub-optimal results. Starting the motion search closer to the presumed solution using a motion vector determined as described above can permit the motion search process to avoid a local minimum and instead find a more optimal solution. Note also that any motion search process may be used, and thus the teachings herein can benefit from other optimizations to motion search algorithms.

Improving the performance of inter prediction can include both improving the time required to calculate the motion vectors and improving the compression ratio of the encoded video stream data. As described herein, determining motion vectors for sub-blocks can be sped up to thereby improve the time required to calculate motion vectors by using candidate motion vectors as discussed above and by limiting the area to be searched. The compression ratio, which can be defined as a comparison between the size of a frame of video data before and after encoding, can be improved by using previously determined motion vectors as starting points for determining reference blocks to be used to predict a current sub-block. Using previously determined motion vectors can avoid local minima while searching that could result in sub-optimal results. Testing of the teachings herein demonstrated effective avoidance of local minima while retaining flexibility in referencing for smaller blocks. Specifically, it resulted in a 50% reduction in computational cost in motion search and improved compression performance by 0.4%.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method comprising:
generating, by a processor in response to instructions stored on a non-transitory computer readable medium, an encoded block by encoding an input block of an input frame of an input video sequence, wherein encoding the input block includes:
identifying the input block as a current block;
identifying a search range corresponding to the input block as a current search range;
identifying a plurality of partition types, wherein the plurality of partition types includes:
a first partition type that omits sub-blocks; and
at least one sub-block partition type that includes sub-blocks;
generating a plurality of rate-distortion metrics for encoding the input block by adaptive motion searching using the current block and the current search range, wherein adaptive motion searching includes:
generating a current block motion vector for the current block by motion searching using the current search range;
generating a current block rate-distortion metric for encoding the current block based on the current block motion vector;
including the current block rate-distortion metric in the plurality of rate-distortion metrics; and
in response to a determination that a current block size of the current block exceeds a smallest sub-block size:
for at least one sub-block partition type from the plurality of partition types:
generating sub-blocks by partitioning the current block according to the partition type, such that each sub-block from the sub-blocks has a sub-block size that is smaller than the current block size; and
for each sub-block from the sub-blocks:
generating sub-block quality metrics for encoding the sub-block, wherein generating the sub-block quality metrics includes:
generating a first sub-block quality metric of the sub-block quality metrics based on the current block motion vector; and
generating a second sub-block quality metric of the sub-block quality metrics based on a neighboring motion vector corresponding to a block spatially neighboring the input block;
identifying the motion vector corresponding to a minimal sub-block quality metric from the sub-block quality metrics as a candidate motion vector;
identifying a sub-block search range for the sub-block based on the candidate motion vector, wherein the sub-block search range is a fraction of the current search range; and
adaptive motion searching using the sub-block as the current block and using the sub-block search range as the current search range;
identifying a first rate-distortion metric from the plurality of rate-distortion metrics, wherein the first rate-distortion metric corresponds to encoding the input block using the first partition type;
identifying a group rate-distortion metric, wherein the group rate-distortion metric is a sum of at least two rate-distortion metrics from the plurality of rate-distortion metrics other than the first rate-distortion metric, wherein each of the at least two rate-distortion metrics corresponds to encoding the input block using at least one sub-block partition type; and
in response to a determination that the first rate-distortion metric exceeds the group rate-distortion metric, including information indicating the at least one sub-block partition type in an output bitstream; and
storing or transmitting the output bitstream.

2. The method of claim 1, wherein identifying the group rate-distortion metric includes:
generating candidate group rate-distortion metrics by:
for each sub-block partition type from the plurality of partition types, identifying, as a respective candidate group rate-distortion metric, a sum of respective rate-distortion metrics from the plurality of rate-distortion metrics, the respective rate-distortion metrics corresponding to the sub-blocks generated based on the respective sub-block partition type; and
for each available combination of sub-block partition types from the plurality of partition types, identifying, as a respective candidate group rate-distortion metric, a sum of respective rate-distortion metrics from the plurality of rate-distortion metrics, the respective rate-distortion metrics corresponding to the sub-blocks generated based on the respective available combination of sub-block partition types; and
identifying a minimal candidate group rate-distortion metric from the candidate group rate-distortion metrics as the group rate-distortion metric.

3. The method of claim 2, wherein the input block includes a plurality of pixels, and wherein identifying the group rate-distortion metric includes identifying each available combination of sub-block partition types such that the respective sub-blocks generated based on the respective available combination of sub-block partition types include the plurality of pixels and omit overlap.

4. The method of claim 1, wherein the plurality of partition types includes:
a horizontal partition type for partitioning the current block horizontally into sub-blocks;
a vertical partition type for partitioning the current block vertically into sub-blocks; and
a split partition type for partitioning the current block vertically and horizontally into sub-blocks.

5. The method of claim 1, wherein generating the sub-block quality metrics includes:
generating a third sub-block quality metric of the sub-block quality metrics based on another neighboring motion vector corresponding to another block spatially neighboring the input block.

6. A method comprising:
generating, by a processor in response to instructions stored on a non-transitory computer readable medium, an encoded block by encoding an input block of an input frame of an input video sequence, wherein encoding the input block includes:
identifying the input block as a current block;
identifying a search range corresponding to the input block as a current search range;

identifying a plurality of partition types, wherein the plurality of partition types includes:
  a first partition type that omits sub-blocks; and
  at least one sub-block partition type that includes sub-blocks;
generating a plurality of rate-distortion metrics for encoding the input block by adaptive motion searching using the current block and the current search range, wherein adaptive motion searching includes:
  generating a current block motion vector for the current block by motion searching using the current search range;
  generating a current block rate-distortion metric for encoding the current block based on the current block motion vector;
  including the current block rate-distortion metric in the plurality of rate-distortion metrics; and
  in response to a determination that a current block size of the current block exceeds a smallest sub-block size:
    for at least one sub-block partition type from the plurality of partition types:
      generating sub-blocks by partitioning the current block according to the partition type, such that each sub-block from the sub-blocks has a sub-block size that is smaller than the current block size; and
      for each sub-block from the sub-blocks:
        identifying, as a candidate motion vector, a motion vector corresponding to a minimal sub-block quality metric from a plurality of sub-block quality metrics for encoding the sub-block;
        identifying a sub-block search range for the sub-block based on the candidate motion vector, wherein the sub-block search range is a fraction of the current search range; and
        adaptive motion searching using the sub-block block as the current block and using the sub-block search range as the current search range;
identifying a first rate-distortion metric from the plurality of rate-distortion metrics, wherein the first rate-distortion metric corresponds to encoding the input block using the first partition type;
identifying a group rate-distortion metric, wherein the group rate-distortion metric is a sum of at least two rate-distortion metrics from the plurality of rate-distortion metrics other than the first rate-distortion metric, wherein each of the at least two rate-distortion metrics corresponds to encoding the input block using at least one sub-block partition type; and
in response to a determination that the first rate-distortion metric exceeds the group rate-distortion metric, including information indicating the at least one sub-block partition type in an output bitstream; and
storing or transmitting the output bitstream.

7. The method of claim 6, wherein identifying the motion vector corresponding to a minimal sub-block quality metric from the plurality of sub-block quality metrics includes generating the plurality of sub-block quality metrics, wherein generating the plurality of sub-block quality metrics includes:
  generating a first sub-block quality metric based on the current block motion vector; and
  including the first sub-block quality metric in the plurality of sub-block quality metrics.

8. The method of claim 7, wherein generating the plurality of sub-block quality metrics includes:
  generating a second sub-block quality metric based on a first neighboring motion vector corresponding to a first block spatially neighboring the input block; and
  including the second sub-block quality metric in the plurality of sub-block quality metrics.

9. The method of claim 8, wherein generating the plurality of sub-block quality metrics includes:
  generating a third sub-block quality metric based on a second neighboring motion vector corresponding to a second block spatially neighboring the input block; and
  including the third sub-block quality metric in the plurality of sub-block quality metrics.

10. The method of claim 6, wherein identifying the group rate-distortion metric includes:
  generating candidate group rate-distortion metrics by:
    for each sub-block partition type from the plurality of partition types, identifying, as a respective candidate group rate-distortion metric, a sum of respective rate-distortion metrics from the plurality of rate-distortion metrics, the respective rate-distortion metrics corresponding to the sub-blocks generated based on the respective sub-block partition type; and
    for each available combination of sub-block partition types from the plurality of partition types, identifying, as a respective candidate group rate-distortion metric, a sum of respective rate-distortion metrics from the plurality of rate-distortion metrics, the respective rate-distortion metrics corresponding to the sub-blocks generated based on the respective available combination of sub-block partition types; and
  identifying a minimal candidate group rate-distortion metric from the candidate group rate-distortion metrics as the group rate-distortion metric.

11. The method of claim 10, wherein the input block includes a plurality of pixels, and wherein identifying the group rate-distortion metric includes identifying each available combination of sub-block partition types such that the respective sub-blocks generated based on the respective available combination of sub-block partition types include the plurality of pixels and omit overlap.

12. The method of claim 6, wherein the plurality of partition types includes:
  a horizontal partition type for partitioning the current block horizontally into sub-blocks;
  a vertical partition type for partitioning the current block vertically into sub-blocks; and
  a split partition type for partitioning the current block vertically and horizontally into sub-blocks.

13. A method comprising:
generating, by a processor in response to instructions stored on a non-transitory computer readable medium, an encoded block by encoding an input block of an input frame of an input video sequence, wherein encoding the input block includes:
  generating a plurality of rate-distortion metrics for encoding the input block by adaptive motion searching using the input block as a current block and using a search range corresponding to the input block as a current search range, wherein adaptive motion searching includes:
    including, in the plurality of rate-distortion metrics, a current block rate-distortion metric for encoding the current block based on a current block motion vector; and in response to a determination that a current block size of the current block exceeds a smallest sub-block size:
for a sub-block partition type from a plurality of partition types for encoding the current block, adaptive motion searching using a sub-block block corresponding to the sub-block partition type as the current block and using a spatially fractional sub-block search range as the current search range;
identifying information indicating the sub-block partition type based on the plurality of rate-distortion metrics, wherein identifying the information indicating the sub-block partition type includes:
identifying a first rate-distortion metric from the plurality of rate-distortion metrics, wherein the first rate-distortion metric corresponds to encoding the input block using a first partition type that omits sub-blocks; and
identifying a group rate-distortion metric, wherein the group rate-distortion metric is a sum of:
a second rate-distortion metrics from the plurality of rate-distortion metrics other than the first rate-distortion metric, wherein the second rate-distortion metric corresponds to encoding the input block using the sub-block partition type; and
a third rate-distortion metrics from the plurality of rate-distortion metrics other than the first rate-distortion metric and the second rate-distortion metric; and
including the information indicating the sub-block partition type in an output bitstream; and
storing or transmitting the output bitstream.

14. The method of claim 13, wherein a cardinality of pixels included in the search range corresponding to the input block is a multiple of a cardinality of pixels included in the spatially fractional sub-block search range.

15. The method of claim 13, wherein adaptive motion searching includes:
generating the current block motion vector for the current block by motion searching using the current search range; and
generating the current block rate-distortion metric.

16. The method of claim 15, wherein adaptive motion searching includes:
in response to the determination that the current block size of the current block exceeds the smallest sub-block size:
generating the sub-block by partitioning the current block according to the partition type, such that the sub-block has a sub-block size that is smaller than the current block size;
identifying, as a candidate motion vector, a motion vector corresponding to a minimal sub-block quality metric from a plurality of sub-block quality metrics for encoding the sub-block; and
identifying the fractional sub-block search range based on the candidate motion vector, wherein the fractional sub-block search range is a fraction of the current search range corresponding to generating the current block motion vector.

17. The method of claim 13, wherein encoding the input block includes:
identifying the plurality of partition types such that the plurality of partition types includes:
the first partition type; and
the sub-block partition type, wherein the sub-block partition type includes sub-blocks.

18. The method of claim 17, wherein including the information indicating the sub-block partition type in the output bitstream includes:
including the information indicating the sub-block partition type in the output bitstream in response to a determination that the first rate-distortion metric exceeds the group rate-distortion metric.

19. The method of claim 17, wherein the plurality of partition types includes:
a horizontal partition type for partitioning the current block horizontally into sub-blocks;
a vertical partition type for partitioning the current block vertically into sub-blocks; and
a split partition type for partitioning the current block vertically and horizontally into sub-blocks.

* * * * *